(12) United States Patent
Perry et al.

(10) Patent No.: US 6,694,472 B1
(45) Date of Patent: Feb. 17, 2004

(54) ERROR CORRECTION FOR FRAMES CARRIED OVER MULTIPLE NETWORKS

(75) Inventors: Mark J. Perry, Cary, NC (US); Patrick J. Dagert, Raleigh, NC (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/567,512

(22) Filed: May 9, 2000

(51) Int. Cl.[7] .................. H03M 13/00; G06F 11/00; H04J 3/24
(52) U.S. Cl. .................. 714/752; 714/701; 370/473
(58) Field of Search .................. 714/701, 746, 714/752, 751, 754, 758, 774, 779, 800, 811, 48, 52, 53; 370/473, 474, 476, 395, 241, 242

(56) References Cited

U.S. PATENT DOCUMENTS

| | | | | |
|---|---|---|---|---|
| 5,935,268 A | * | 8/1999 | Weaver | 714/758 |
| 6,141,788 A | * | 10/2000 | Rosenberg et al. | 714/774 |
| 6,226,769 B1 | * | 5/2001 | Schuster et al. | 714/752 |
| 6,256,323 B1 | * | 7/2001 | Benayoun et al. | 370/474 |
| 6,445,717 B1 | * | 9/2002 | Gibson et al. | 370/473 |

* cited by examiner

*Primary Examiner*—Christine T. Tu
(74) *Attorney, Agent, or Firm*—Winthrow & Terranova, P.L.L.C.

(57) ABSTRACT

In general, the invention is directed to creating and placing an error correction code in a cell for error correction of data or frames carried by that cell or related cells. When frames of data arrive at a gateway between two networks, the frames of data are mapped into cells used for transport. Error correction codes are generated and placed into the payload of each transport frame or cell. The transport cells encapsulating the data frames are carried over the network to another gateway, wherein the transport cells are processed and corrected for errors based on an error correction code in one of the transport cells.

Providing the error correction code allows for the correction of lost or corrupted information during transport without requiring retransmission of data. When multiple frames of data are mapped into a transport cell, error correction for one transport cell will minimize the need for retransmission of multiple data frames.

33 Claims, 8 Drawing Sheets

| | | | | | |
|---|---|---|---|---|---|
| 0  193  183  CELL 1 | 7  193  176  CELL 21 | 4  193  179  CELL 40 | 1  193  182  CELL 59 | 8  193  175  CELL 79 | .... |
| 10  193  173  CELL 2 | 17  193  166  CELL 22 | 14  193  169  CELL 41 | 11  193  172  CELL 60 | 18  193  165  CELL 80 | .... |
| 20  193  163  CELL 3 | 27  193  156  CELL 23 | 24  193  159  CELL 42 | 21  193  162  CELL 61 | 28  193  155  CELL 81 | .... |
| 30  193  153  CELL 4 | 37  193  146  CELL 24 | 34  193  149  CELL 43 | 31  193  152  CELL 62 | 38  193  145  CELL 82 | .... |
| 40  193  143  CELL 5 | 47  193  136  CELL 25 | 44  193  139  CELL 44 | 41  193  142  CELL 63 | 48  193  135  CELL 83 | .... |
| 50  193  133  CELL 6 | 57  193  126  CELL 26 | 54  193  129  CELL 45 | 51  193  132  CELL 64 | 58  193  125  CELL 84 | .... |
| 60  193  123  CELL 7 | 67  193  116  CELL 27 | 64  193  119  CELL 46 | 61  193  122  CELL 65 | 68  193  115  CELL 85 | .... |
| 70  193  113  CELL 8 | 77  193  106  CELL 28 | 74  193  109  CELL 47 | 71  193  112  CELL 66 | 78  193  105  CELL 86 | .... |
| 80  193  103  CELL 9 | 87  193  96  CELL 29 | 84  193  99  CELL 48 | 81  193  102  CELL 67 | 88  193  95  CELL 87 | .... |
| 90  193  93  CELL 10 | 97  193  86  CELL 30 | 94  193  89  CELL 49 | 91  193  92  CELL 68 | 98  193  85  CELL 88 | .... |
| 100  193  83  CELL 11 | 107  193  76  CELL 31 | 104  193  79  CELL 50 | 101  193  82  CELL 69 | 108  193  75  CELL 89 | .... |
| 110  193  73  CELL 12 | 117  193  66  CELL 32 | 114  193  69  CELL 51 | 111  193  72  CELL 70 | 118  193  65  CELL 90 | .... |
| 120  193  63  CELL 13 | 127  193  56  CELL 33 | 124  193  59  CELL 52 | 121  193  62  CELL 71 | 128  193  55  CELL 91 | .... |
| 130  193  53  CELL 14 | 137  193  46  CELL 34 | 134  193  49  CELL 53 | 131  193  52  CELL 72 | 138  193  45  CELL 92 | .... |
| 140  193  43  CELL 15 | 147  193  36  CELL 35 | 144  193  39  CELL 54 | 141  193  42  CELL 73 | 148  193  35  CELL 93 | .... |
| 150  193  33  CELL 16 | 157  193  26  CELL 36 | 154  193  29  CELL 55 | 151  193  32  CELL 74 | 158  193  25  CELL 94 | .... |
| 160  193  23  CELL 17 | 167  193  16  CELL 37 | 164  193  19  CELL 56 | 161  193  22  CELL 75 | 168  193  15  CELL 95 | .... |
| 170  193  13  CELL 18 | 177  193  6  CELL 38 | 174  193  9  CELL 57 | 171  193  12  CELL 76 | 178  193  5  CELL 96 | .... |
| 180  193  3  CELL 19 | 187  0  189  CELL 39 | 184  0  192  CELL 58 | 181  193  2  CELL 77 | 188  0  188  CELL 97 | .... |
| 190  0  186  CELL 20 | | | 191  0  185  CELL 78 | | .... |

*FIG. 3A*

| FIG. 3 | |
|---|---|
| FIG. 3A | FIG. 3B |

| | | | | | |
|---|---|---|---|---|---|
| .... | 5 193 178<br>CELL 98 | 2 193 181<br>CELL 117 | 9 193 174<br>CELL 137 | 6 193 177<br>CELL 156 | 3 193 180<br>CELL 175 |
| .... | 15 193 168<br>CELL 99 | 12 193 171<br>CELL 118 | 19 193 164<br>CELL 138 | 16 193 167<br>CELL 157 | 13 193 170<br>CELL 176 |
| .... | 25 193 158<br>CELL 100 | 22 193 161<br>CELL 119 | 29 193 154<br>CELL 139 | 26 193 157<br>CELL 158 | 23 193 160<br>CELL 177 |
| .... | 35 193 148<br>CELL 101 | 32 193 151<br>CELL 120 | 39 193 144<br>CELL 140 | 36 193 147<br>CELL 159 | 33 193 150<br>CELL 178 |
| .... | 45 193 138<br>CELL 102 | 42 193 141<br>CELL 121 | 49 193 134<br>CELL 141 | 46 193 137<br>CELL 160 | 43 193 140<br>CELL 179 |
| .... | 55 193 128<br>CELL 103 | 52 193 131<br>CELL 122 | 59 193 124<br>CELL 142 | 56 193 127<br>CELL 161 | 53 193 130<br>CELL 180 |
| .... | 65 193 118<br>CELL 104 | 62 193 121<br>CELL 123 | 69 193 114<br>CELL 143 | 66 193 117<br>CELL 162 | 63 193 120<br>CELL 181 |
| .... | 75 193 108<br>CELL 105 | 72 193 111<br>CELL 124 | 79 193 104<br>CELL 144 | 76 193 107<br>CELL 163 | 73 193 110<br>CELL 182 |
| .... | 85 193 98<br>CELL 106 | 82 193 101<br>CELL 125 | 89 193 94<br>CELL 145 | 86 193 97<br>CELL 164 | 83 193 100<br>CELL 183 |
| .... | 95 193 88<br>CELL 107 | 92 193 91<br>CELL 126 | 99 193 84<br>CELL 146 | 96 193 87<br>CELL 165 | 93 193 90<br>CELL 184 |
| .... | 105 193 78<br>CELL 108 | 102 193 81<br>CELL 127 | 109 193 74<br>CELL 147 | 106 193 77<br>CELL 166 | 103 193 80<br>CELL 185 |
| .... | 115 193 68<br>CELL 109 | 112 193 71<br>CELL 128 | 119 193 64<br>CELL 148 | 116 193 67<br>CELL 167 | 113 193 70<br>CELL 186 |
| .... | 125 193 58<br>CELL 110 | 122 193 61<br>CELL 129 | 129 193 54<br>CELL 149 | 126 193 57<br>CELL 168 | 123 193 60<br>CELL 187 |
| .... | 135 193 48<br>CELL 111 | 132 193 51<br>CELL 130 | 139 193 44<br>CELL 150 | 136 193 47<br>CELL 169 | 133 193 50<br>CELL 188 |
| .... | 145 193 38<br>CELL 112 | 142 193 41<br>CELL 131 | 149 193 34<br>CELL 151 | 146 193 37<br>CELL 170 | 143 193 40<br>CELL 189 |
| .... | 155 193 28<br>CELL 113 | 152 193 31<br>CELL 132 | 159 193 24<br>CELL 152 | 156 193 27<br>CELL 171 | 153 193 30<br>CELL 190 |
| .... | 165 193 18<br>CELL 114 | 162 193 21<br>CELL 133 | 169 193 14<br>CELL 153 | 166 193 17<br>CELL 172 | 163 193 20<br>CELL 191 |
| .... | 175 193 8<br>CELL 115 | 172 193 11<br>CELL 134 | 179 193 4<br>CELL 154 | 176 193 7<br>CELL 173 | 173 193 10<br>CELL 192 |
| .... | 185 0 191<br>CELL 116 | 182 193 1<br>CELL 135 | 189 0 187<br>CELL 155 | 186 0 190<br>CELL 174 | 183 193 0<br>CELL 193 |
| .... | | 192 0 184<br>CELL 136 | | | |

*FIG. 3B*

| ONE OF THE 193 POSSIBLE COMBINATIONS | | | | ONE OF THE 193 POSSIBLE COMBINATIONS | | | | ONE OF THE 193 POSSIBLE COMBINATIONS | | | | ONE OF THE 193 POSSIBLE COMBINATIONS | | | | |
|---|---|---|---|---|---|---|---|---|---|---|---|---|---|---|---|---|
| x | y | z | r | x | y | z | r | x | y | z | r | x | y | z | r | |
| 0 | 193 | 122 | 53 | 7 | 193 | 115 | 53 | 14 | 193 | 108 | 53 | 21 | 193 | 101 | 53 | .... |
| 71 | 193 | 51 | 53 | 78 | 193 | 44 | 53 | 85 | 193 | 37 | 53 | 92 | 193 | 30 | 53 | .... |
| 142 | 0 | 173 | 53 | 149 | 0 | 166 | 53 | 156 | 0 | 159 | 53 | 163 | 0 | 152 | 53 | .... |
| 20 | 193 | 102 | 53 | 27 | 193 | 95 | 53 | 34 | 193 | 88 | 53 | 41 | 193 | 81 | 53 | .... |
| 91 | 193 | 31 | 53 | 98 | 193 | 24 | 53 | 105 | 193 | 17 | 53 | 112 | 193 | 10 | 53 | .... |
| 162 | 0 | 153 | 53 | 169 | 0 | 146 | 53 | 176 | 0 | 139 | 53 | 183 | 0 | 132 | 53 | .... |
| 40 | 193 | 82 | 53 | 47 | 193 | 75 | 53 | 54 | 193 | 68 | 53 | 61 | 193 | 61 | 53 | .... |
| 111 | 193 | 11 | 53 | 118 | 193 | 4 | 53 | 125 | 0 | 190 | 53 | 132 | 0 | 183 | 53 | .... |
| 182 | 0 | 133 | 53 | 189 | 0 | 126 | 53 | 3 | 193 | 119 | 53 | 10 | 193 | 112 | 53 | .... |
| 60 | 193 | 62 | 53 | 67 | 193 | 55 | 53 | 74 | 193 | 48 | 53 | 81 | 193 | 41 | 53 | .... |
| 131 | 0 | 184 | 53 | 138 | 0 | 177 | 53 | 145 | 0 | 170 | 53 | 152 | 0 | 163 | 53 | .... |
| 9 | 193 | 113 | 53 | 16 | 193 | 106 | 53 | 23 | 193 | 99 | 53 | 30 | 193 | 92 | 53 | .... |
| 80 | 193 | 42 | 53 | 87 | 193 | 35 | 53 | 94 | 193 | 28 | 53 | 101 | 193 | 21 | 53 | .... |
| 151 | 0 | 164 | 53 | 158 | 0 | 157 | 53 | 165 | 0 | 150 | 53 | 172 | 0 | 143 | 53 | .... |
| 29 | 193 | 93 | 53 | 36 | 193 | 86 | 53 | 43 | 193 | 79 | 53 | 50 | 193 | 72 | 53 | .... |
| 100 | 193 | 22 | 53 | 107 | 193 | 15 | 53 | 114 | 193 | 8 | 53 | 121 | 193 | 1 | 53 | .... |
| 171 | 0 | 144 | 53 | 178 | 0 | 137 | 53 | 185 | 0 | 130 | 53 | 192 | 0 | 123 | 53 | .... |
| 49 | 193 | 73 | 53 | 56 | 193 | 66 | 53 | 63 | 193 | 59 | 53 | 70 | 193 | 52 | 53 | .... |
| 120 | 193 | 2 | 53 | 127 | 0 | 188 | 53 | 134 | 0 | 181 | 53 | 141 | 0 | 174 | 53 | .... |
| 191 | 0 | 124 | 53 | 5 | 193 | 117 | 53 | 12 | 193 | 110 | 53 | 19 | 193 | 103 | 53 | .... |
| 69 | 193 | 53 | 53 | 76 | 193 | 46 | 53 | 83 | 193 | 39 | 53 | 90 | 193 | 32 | 53 | .... |
| 140 | 0 | 175 | 53 | 147 | 0 | 168 | 53 | 154 | 0 | 161 | 53 | 161 | 0 | 154 | 53 | .... |
| 18 | 193 | 104 | 53 | 25 | 193 | 97 | 53 | 32 | 193 | 90 | 53 | 39 | 193 | 83 | 53 | .... |
| 89 | 193 | 33 | 53 | 96 | 193 | 26 | 53 | 103 | 193 | 19 | 53 | 110 | 193 | 12 | 53 | .... |
| 160 | 0 | 155 | 53 | 167 | 0 | 148 | 53 | 174 | 0 | 141 | 53 | 181 | 0 | 134 | 53 | .... |
| 38 | 193 | 84 | 53 | 45 | 193 | 77 | 53 | 52 | 193 | 70 | 53 | 59 | 193 | 63 | 53 | .... |
| 109 | 193 | 13 | 53 | 116 | 193 | 6 | 53 | 123 | 0 | 192 | 53 | 130 | 0 | 185 | 53 | .... |
| 180 | 0 | 135 | 53 | 187 | 0 | 128 | 53 | 1 | 193 | 121 | 53 | 8 | 193 | 114 | 53 | .... |
| 58 | 193 | 64 | 53 | 65 | 193 | 57 | 53 | 72 | 193 | 50 | 53 | 79 | 193 | 43 | 53 | .... |
| 129 | 0 | 186 | 53 | 136 | 0 | 179 | 53 | 143 | 0 | 172 | 53 | 150 | 0 | 165 | 53 | .... |

| FIG. 8A | FIG. 8B |
|---|---|

| ONE OF THE 193 POSSIBLE COMBINATIONS | | | | ONE OF THE 193 POSSIBLE COMBINATIONS | | | | ONE OF THE 193 POSSIBLE COMBINATIONS | | | |
|---|---|---|---|---|---|---|---|---|---|---|---|
| x | y | z | r | x | y | z | r | x | y | z | r |
| 28 | 193 | 94 | 53 | 35 | 193 | 87 | 53 | 42 | 193 | 80 | 53 |
| 99 | 193 | 23 | 53 | 106 | 193 | 16 | 53 | 113 | 193 | 9 | 53 |
| 170 | 0 | 145 | 53 | 177 | 0 | 138 | 53 | 184 | 0 | 131 | 53 |
| 48 | 193 | 74 | 53 | 55 | 193 | 67 | 53 | 62 | 193 | 60 | 53 |
| 119 | 193 | 3 | 53 | 126 | 0 | 189 | 53 | 133 | 0 | 182 | 53 |
| 190 | 0 | 125 | 53 | 4 | 193 | 118 | 53 | 11 | 193 | 111 | 53 |
| 68 | 193 | 54 | 53 | 75 | 193 | 47 | 53 | 82 | 193 | 40 | 53 |
| 139 | 0 | 176 | 53 | 146 | 0 | 169 | 53 | 153 | 0 | 162 | 53 |
| 17 | 193 | 105 | 53 | 24 | 193 | 98 | 53 | 31 | 193 | 91 | 53 |
| 88 | 193 | 34 | 53 | 95 | 193 | 27 | 53 | 102 | 193 | 20 | 53 |
| 159 | 0 | 156 | 53 | 166 | 0 | 149 | 53 | 173 | 0 | 142 | 53 |
| 37 | 193 | 85 | 53 | 44 | 193 | 78 | 53 | 51 | 193 | 71 | 53 |
| 108 | 193 | 14 | 53 | 115 | 193 | 7 | 53 | 122 | 193 | 0 | 53 |
| 179 | 0 | 136 | 53 | 186 | 0 | 129 | 53 | | | | |
| 57 | 193 | 65 | 53 | 64 | 193 | 58 | 53 | | | | |
| 128 | 0 | 187 | 53 | 135 | 0 | 180 | 53 | | | | |
| 6 | 193 | 116 | 53 | 13 | 193 | 109 | 53 | | | | |
| 77 | 193 | 45 | 53 | 84 | 193 | 38 | 53 | | | | |
| 148 | 0 | 167 | 53 | 155 | 0 | 160 | 53 | | | | |
| 26 | 193 | 96 | 53 | 33 | 193 | 89 | 53 | | | | |
| 97 | 193 | 25 | 53 | 104 | 193 | 18 | 53 | | | | |
| 168 | 0 | 147 | 53 | 175 | 0 | 140 | 53 | | | | |
| 46 | 193 | 76 | 53 | 53 | 193 | 69 | 53 | | | | |
| 117 | 193 | 5 | 53 | 124 | 0 | 191 | 53 | | | | |
| 188 | 0 | 127 | 53 | 2 | 193 | 120 | 53 | | | | |
| 66 | 193 | 56 | 53 | 73 | 193 | 49 | 53 | | | | |
| 137 | 0 | 178 | 53 | 144 | 0 | 171 | 53 | | | | |
| 15 | 193 | 107 | 53 | 22 | 193 | 100 | 53 | | | | |
| 86 | 193 | 36 | 53 | 93 | 193 | 29 | 53 | | | | |
| 157 | 0 | 158 | 53 | 164 | 0 | 151 | 53 | | | | |

*FIG. 8B*

ERROR CORRECTION FOR FRAMES CARRIED OVER MULTIPLE NETWORKS

FIELD OF THE INVENTION

This invention generally relates to error correction for data transmitted in a network, and particularly relates to facilitating error correction of frames carried over a network.

BACKGROUND OF THE INVENTION

Given the ever-increasing demands for voice, data, and multimedia communications, corporations are continuing to take advantage of the high-speed digital communications of the T Carrier systems. The most prominent carrier system is the T1. A T1 describes the physical layer interface to a provider network. Once the T1 carrier is in place and terminated, a customer may generate traffic. The digital signal transmitted over a T1 is referred to as digital signal level one (DS1). DS1 operates at a digital signaling rate of 1.544 Mbps.

DS1 traffic is arranged in fixed-length frames, wherein each frame consists of 193 bits of information created in 125 μseconds. One bit is used for framing and the other 192 bits are used for customer traffic. The 192 bits could be data or 24 eight-bit voice channels. Since one frame is created every 125 μseconds, there are 8,000 frames per second, which results in the desired 1.544 Mbps data rate. Typical DS1 framing and formatting is shown in FIG. 1.

The key quality measure for DS1 service is frame error rate. The consequences of frame errors are loss of quality for certain applications like voice or video, or loss of efficiency due to the application requiring retransmission of the data. In the past, DS1 traffic was carried entirely over traditional time division multiplexing (TDM) networks. There is now a movement to carry DS1 traffic over ATM (Asynchronous Transfer Mode) networks. ATM is a connection-oriented, packet-switching network technology that uses fixed-size cells to carry data. ATM requires that all cells be the same size to enable faster switching and relay across ATM switches, which make up the ATM network.

Each ATM cell is 53 octets long, including a 48-octet payload preceded by a 5-octet header. Notably, other octets of the 48-octet payload may be used for the ATM adaption layer, which facilitates mapping data into and extracting data from a cell. For example, AAL1 (ATM Adaption Layer 1) has been commonly used to carry circuit-switched voice information. An emerging AAL1 use is circuit emulation for carrying DS1. AAL1 uses one octet out of the 48-octet payload.

When carrying DS1 traffic over an ATM network, the fixed DS1 frames of 193 bits do not map directly into the 47 octets (376 bits) remaining in the payload of an ATM cell. When DS1 frames are consecutively mapped into the payload of ATM cells, the error rate for transport increases substantially over that normally associated with transporting DS1 frames over a TDM network. There are several reasons for this increased error rate. First, the use of ATM requires additional data manipulation, which may cause error. This manipulation includes mapping of all or part of a DS1 frame into an ATM cell, removing the DS1 frame or portion thereof from the ATM cell, and reassembling DS1 frames for transport over a final DS1-compatible carrier.

Second, carrying DS1 frames over an ATM network requires the addition of information in the form of a header, which must be communicated accurately for proper transport of the DS1 frame. Third, corruption of any single ATM cell likely leads to the corruption or loss of multiple DS1 frames having portions carried within the corrupted cell. Finally, ATM networks, unlike TDM networks, will lose DS1 frames due to lost ATM cells caused by traffic congestion.

Corruption and loss of ATM cells have a significant impact on error rates and efficiency. If a cell is lost or corrupted, DS1 frame errors will occur. Network designers typically try to maximize efficiency by packing as much information into each cell as possible. Because of this, a direct mapping of DS1 frames into ATM cells will include at least portions of two or three DS1 frames. Thus, loss of one cell results in up to three DS1 frame errors.

A direct mapping of DS1 frames into ATM cells is shown in FIGS. 3A and 3B. The first number in each cell represents the number of bits from a partial DS1 frame carried in a previous ATM cell. The second number indicates that either a full 193-bit DS1 frame was mapped in the cell or no full DS1 frame was placed in the cell. The third number indicates the number of bits of a partial frame, the remainder of which will be mapped in a subsequent ATM cell.

When carrying DS1 over an ATM network in this manner, the ATM network will multiply the error rate normally occurring over TDM networks. For direct mapping, the frame loss due to bit errors for DS1 traffic will be on the order of 3.3 times (or more) worse when carried over ATM. If cell loss due to traffic is also considered, then DS1 frame loss will be orders of magnitude greater than that of a standard TDM network.

Therefore, there is a need to provide efficient transmission of DS1 traffic over an ATM network without increasing the error rate normally associated with DS1 traffic carried over a traditional TDM network.

SUMMARY OF THE INVENTION

The present invention provides for efficient transmission of DS1 traffic over an ATM network without increasing the frame error rate normally associated with DS1 traffic. These improvements are achieved by inserting into each ATM cell payload information from one or more DS1 frames and error correction bits for an error correction code. The error correction code is configured to facilitate error correction associated with the transport of DS1 frames over the ATM network. Error correction is provided when the DS1 frames are extracted from the ATM cells for final transport over another TDM network.

The error correction code may correct errors in a portion of a DS1 frame, an entire DS1 frame, a portion of an ATM cell, or an entire ATM cell. Further, the error correction code may correspond to the information within the cell in which the error correction code is transported or may relate only to other ATM cells. The extent and robustness of error correction is variable based on need.

In general, creating and placing an error correction code in a cell for error correction of data or frames carried by that cell or related cells is applicable for various network technologies. When frames of data arrive at a gateway between two networks, the frames of data are mapped into cells used for transport. Error correction codes are generated and added into the payload of each transport frame or cell. The transport cells encapsulating the data frames and error correction code are carried over the network to another gateway, wherein the transport cells are processed and corrected for errors based on an error correction code in the transport cells.

Providing the error correction code allows for the correction of lost or corrupted information during transport without requiring retransmission of data. When multiple frames of data are mapped into a transport cell, error correction for one transport cell will eliminate multiple frame errors. Other aspects and features of the present invention will become apparent to those skilled in the art.

BRIEF DESCRIPTION OF THE DRAWING FIGURES

FIGS. 3A and 3B show an exemplary direct mapping of DS1 frames into ATM cells. (FIG. 3 depicts the association of FIGS. 3A and 3B to form a table extending over two sheets.)

Figure 6:
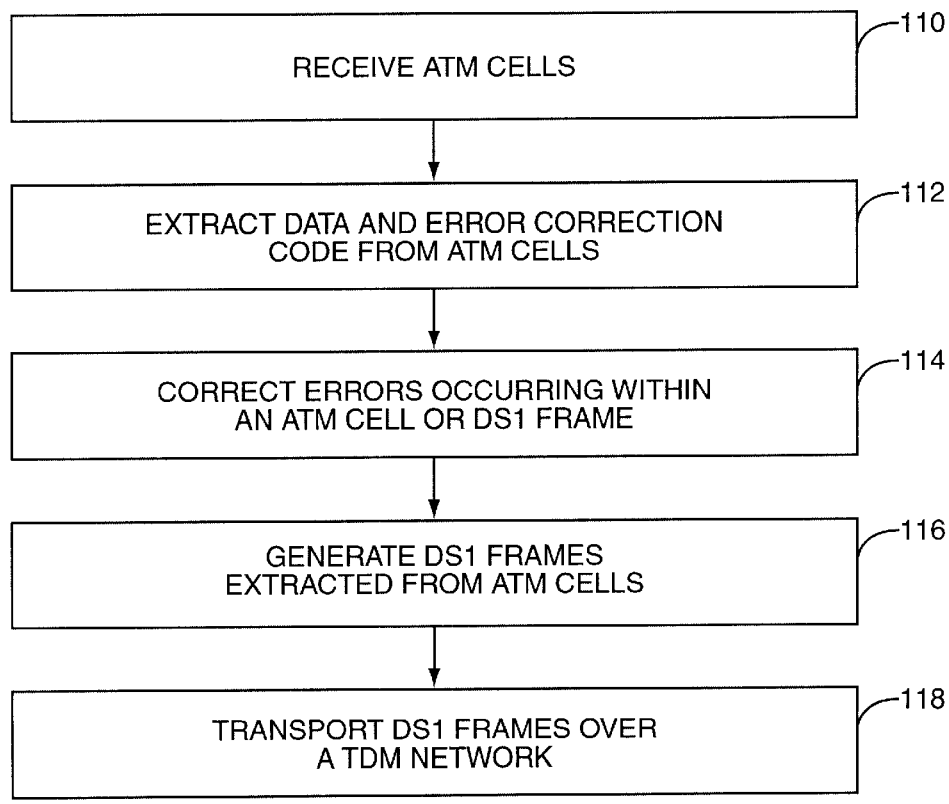

FIG. 6 outlines the basic process of extracting DS1 frames from ATM cells according to the present invention.

Figure 7:
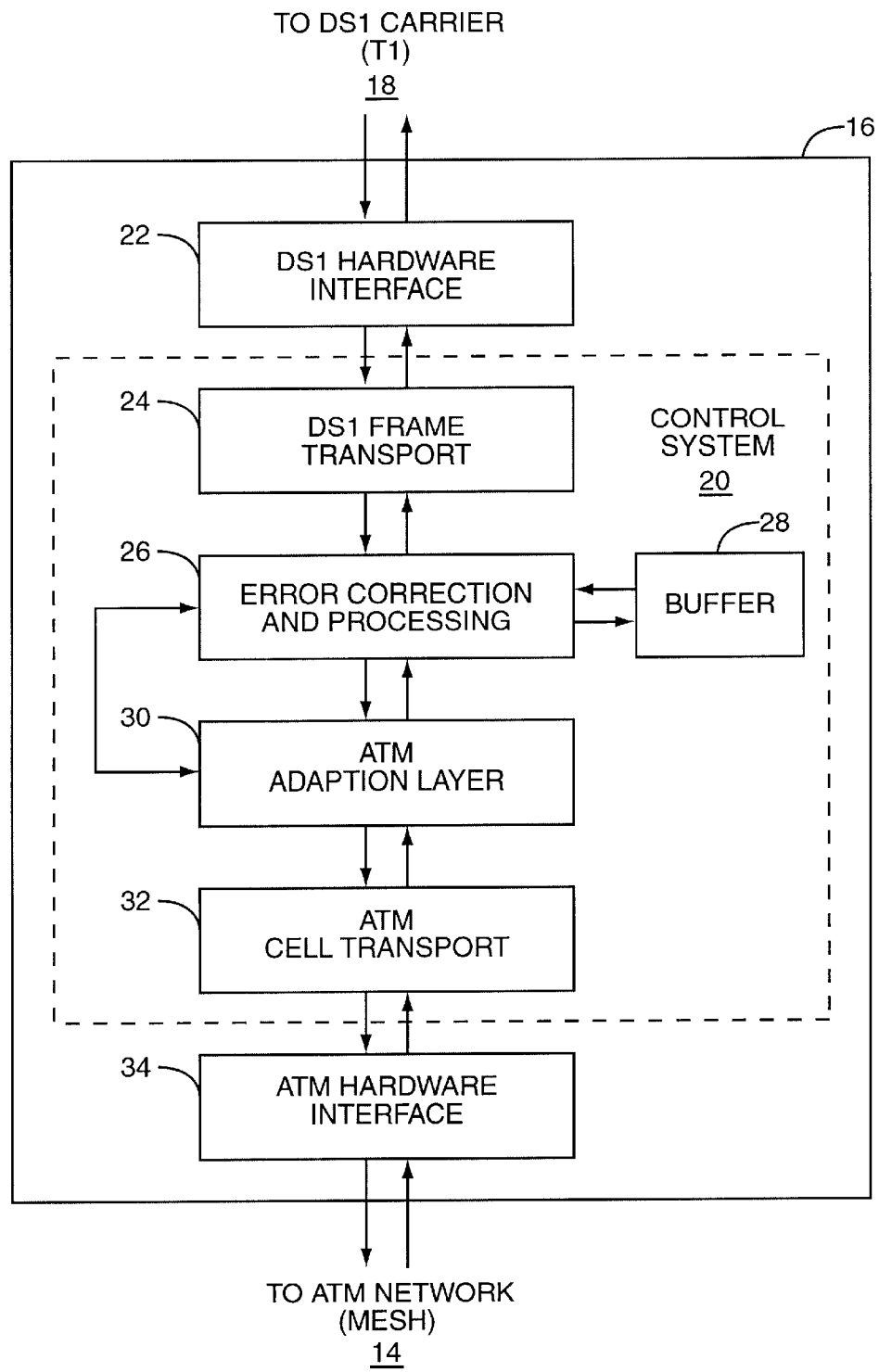

FIG. 7 is a block representation of a media gateway constructed according to the present invention.

FIGS. 8A and 8B represent the mapping of DS1 frames and error codes within multiple ATM cells according to one embodiment of the present invention. (FIG. 8 depicts the association of FIGS. 8A and 8B to form a table extending over two sheets.)

DETAILED DESCRIPTION OF THE PREFERRED EMBODIMENTS

The present invention significantly reduces error rates associated with carrying DS1 frames over an ATM network. Although the preferred embodiments of the invention relate to carrying DS1 frames over an ATM network, the inventive concepts are applicable to a variety of networking configurations and technologies wherein frames of data in one network are transported in frames or cells over a second network using a different network technology. The invention is particularly useful when the first network technology includes framing information in fixed-length frames of one length and maps those frames into fixed-length frames having a different length for transport over the second network.

Figure 1:
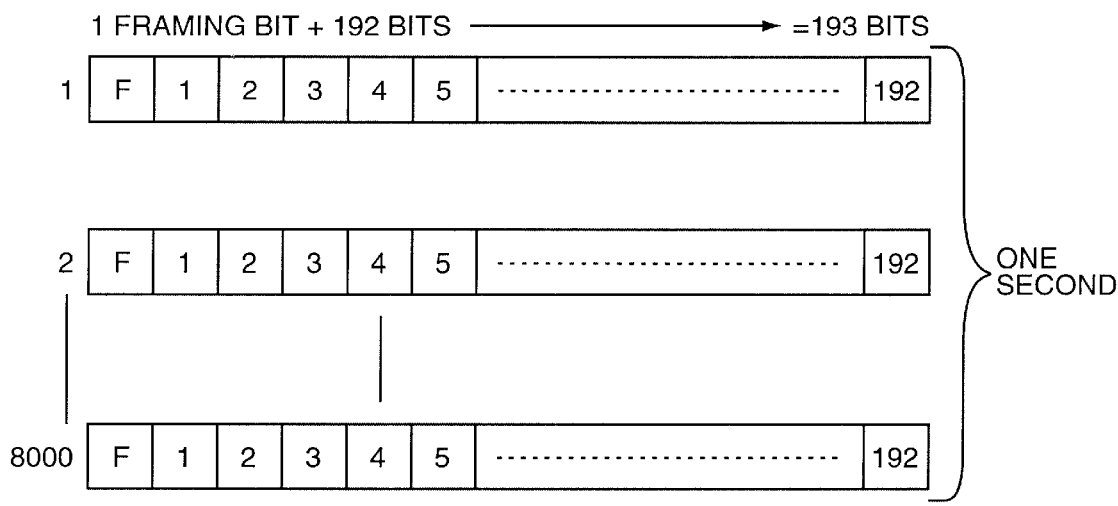
FIG. 1 is a representation of DS1 framing.
Figure 2:
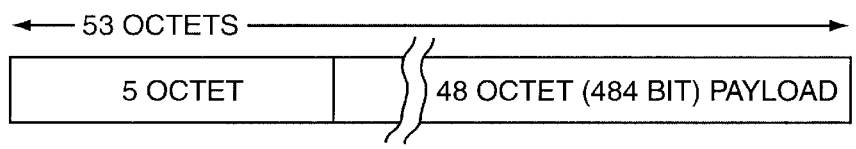
FIG. 2 is a representation of an ATM cell.
Figure 4:
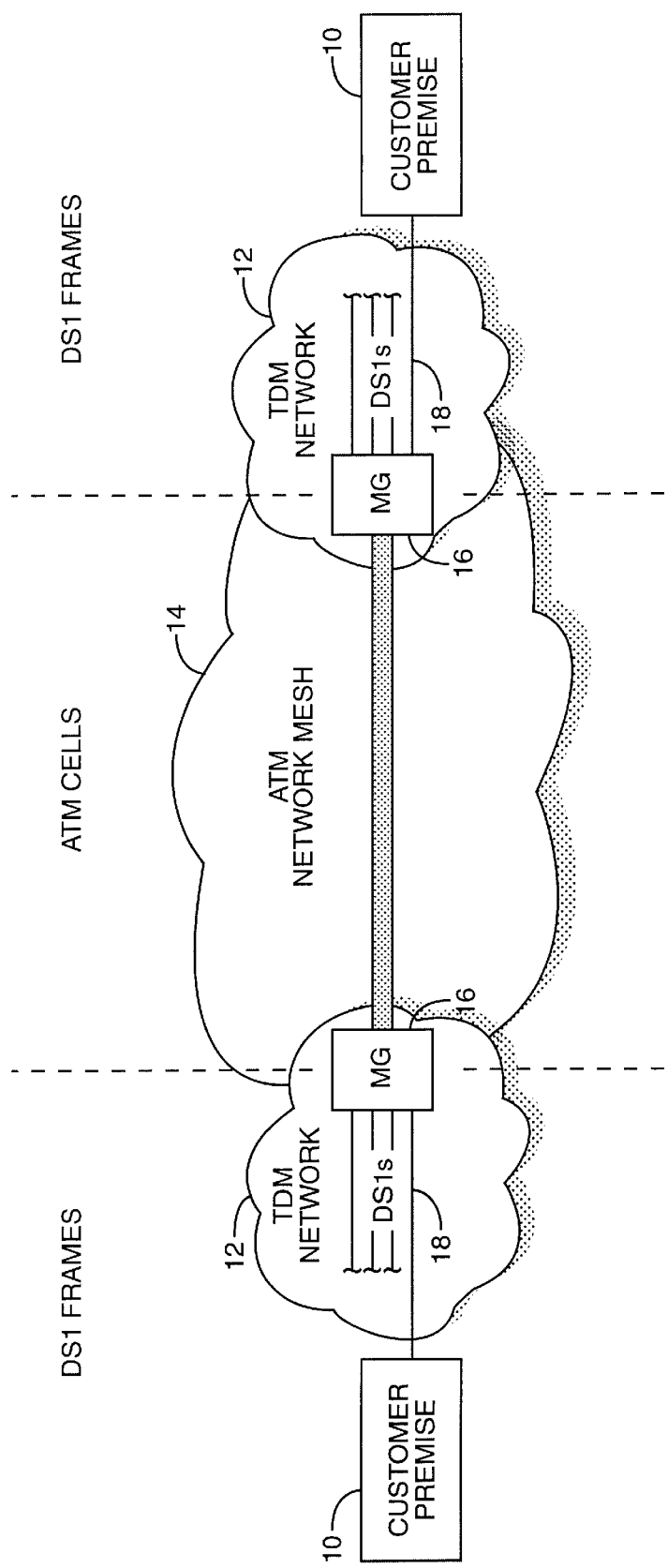
FIG. 4 is a representation of two TDM networks coupled via an ATM network.

Turning now to FIG. 4, information is passed between customer premises 10 over two time-division multiplexing (TDM) networks 12 that are connected by an ATM network 14. The connection of the ATM network 14 to either one of the TDM networks 12 is facilitated by a media gateway 16. Each media gateway 16 is preferably coupled to the ATM network switching mesh as well as to DS1 carriers 18, such as T1s. The DS1 carriers ultimately connect each media gateway 16 to the corresponding customer premise 10. Notably, the TDM networks 12 and ATM network 14 are typically made up of smaller networks coupled together with any number of switches, routers, bridges, or relays.

The ATM network consists of multiple switches interconnected to form the switching mesh. The mesh operates like a single network that allows any termination, such as the gateway 16, to communicate with any other termination. For additional information, attention is directed to Nortel Networks: The Complete Reference, James Knapp, Osborne/McGraw/Hill, 1999 and Broadband Telecommunications Handbook, Regis J. "Bud" Bates, McGraw-Hill, 2000, the disclosures of which are incorporated herein by reference.

In operation, DS1 frames are received over a DS1 carrier 18 from a customer premise 10 at one media gateway 16. The DS1 frames are mapped into ATM cells and transferred across the ATM network over a virtual circuit to the other media gateway 16. ATM is a connection-oriented technology, which requires communicating devices to establish a virtual circuit through the network before data is transferred. Once ATM cells are transferred over the virtual circuit of the ATM network from one media gateway 16 to another, the ATM cells are processed to extract the DS1 frames. The DS1 frames are assembled as necessary and transferred over the proper DS1 carrier 18 to the appropriate destination (i.e. customer premise 10).

Figure 5:
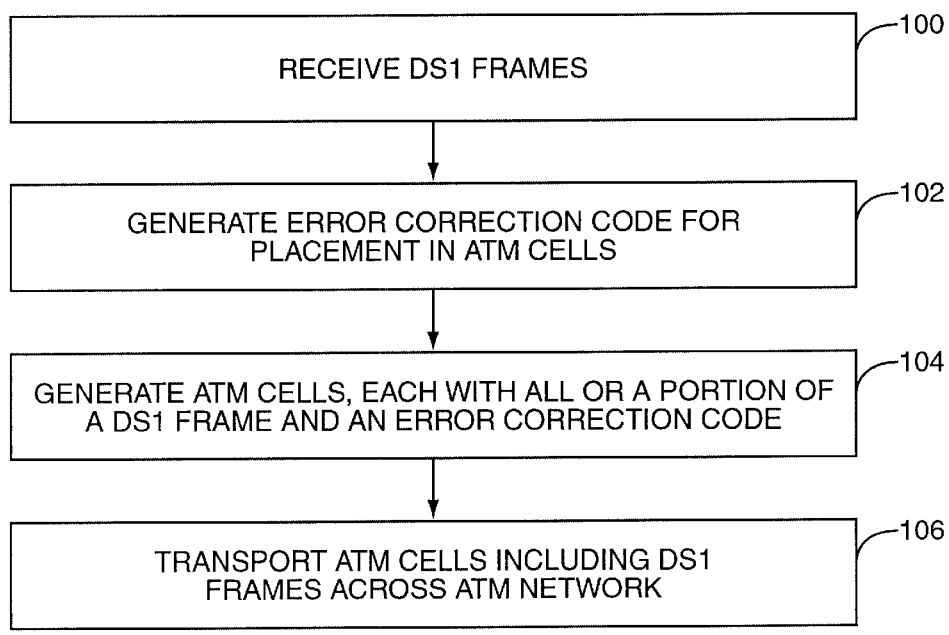
FIG. 5 is a flow chart outlining the basic process of mapping DS1 frames into ATM cells according to the present invention.

The present invention significantly reduces error rates associated with this process as outlined in the flow charts of FIGS. 5 and 6. With particular reference to FIG. 5, DS1 frames are received (block 100) at the media gateway 16. Upon receipt, the DS1 frames are processed and an error correction code is generated (block 102) for placement in each ATM cell. ATM cells are generated, each including at least a portion of a DS1 frame and an error correction code (block 104). The ATM cells are transported (block 106) across the ATM network 14 to a remote media gateway 16. The error correction code, which is described in greater detail below, is adapted to facilitate error correction when ATM cells carrying DS1 frames are processed to recover DS1 frames at the remote media gateway 16.

Turning now to FIG. 6, at the opposite end of the ATM network 14, the ATM cells are received (block 110) at the remote media gateway 16. The data, which includes all or a portion of select DS1 frames, and the error correction code are extracted from each ATM cell (block 112). Based on the recovered data and error correction code, errors are corrected for one or more ATM cells, and preferably for the DS1 frames within those cells (block 114). Notably, the error correction code in one ATM cell may be used to correct errors in other ATM cells arriving before or after the ATM cell from which the error code was extracted. Further, error correction may include simply correcting one or more corrupted bits within the DS1 frame carried in the ATM cell payload; regenerating an entire DS1 frame; or regenerating a lost ATM cell. The amount of error correction available is dependent upon the amount of overhead allocated to the error correction code and how the error correction code was generated. Next, DS1 frames are reassembled from the payload of the ATM cells (block 116) and transported to their ultimate destination over the DS1 carrier 18 of the TDM network (block 118).

As indicated, the transport of DS1 frames over an ATM network is preferably facilitated using a media gateway 16, such as that diagrammed in FIG. 7. Those of ordinary skill in the art will recognize that the depiction of the media gateway 16 in FIG. 7 is a block representation of select hardware and software applications as they relate to the mapping of DS1 frames into ATM cells, and vice versa.

Those skilled in the art will recognize that various gateway, router and switch configurations and combinations may function as a media gateway, and should be considered within the scope of the disclosure. Additional information for these products is available from Nortel Networks.

The media gateway 16 will include a control system 20 having the necessary processing and memory capability to operate and control the various aspects of the gateway. As depicted, the media gateway 16 receives DS1 frames from a DS1 carrier 18 through a DS1 hardware interface 22. A DS1 frame transport 24 moves the DS1 frames from the DS1 hardware interface 22 to an error correction processing application 26. Depending on the error correction technique used, a buffer 28 may be necessary in order to store multiple DS1 frames or ATM cells for generating the error correction code (and for facilitating error correction when cells are received as described below).

An ATM adaption layer 30 receives the DS1 frames and error correction codes from the error correction processing application 26 and generates ATM cells. An ATM cell transport 32 is used to transfer the ATM cells to the ATM hardware interface 34, which is connected to the ATM network 14. The ATM hardware interface 34 may be an ATM switch, which is coupled to other ATM switches within the ATM network 14.

Preferably, the media gateway 16 not only processes DS1 frames into ATM cells, but also receives ATM cells including all or a portion of a DS1 frame and an error correction code. The media gateway 16 also facilitates extraction and correction of errors in the ATM cell to recover the originally transmitted DS1 frames. As such, ATM cells arrive from the ATM network 14 at the ATM hardware interface 34. The ATM cell transport 32 forwards the ATM cells to the ATM adaption layer 30, which extracts data from the incoming ATM cells. The extracted data will include all or a portion of a DS1 frame and an error correction code. Errors occurring in the DS1 frames are corrected using the error code, and the restructured DS1 frames are forwarded to the DS1 hardware interface 22. The DS1 frames are then sent across the DS1 carrier 18 to the proper destination.

The error correction and processing application 26 and the ATM adaption layer may cooperate such that the error correction may correct errors within DS1 frames carried in the ATM cells, as well as errors throughout the ATM cell. Error correction may include replacement of lost frames or cells, assuming that the error correction code is configured to do so.

The error correction code generated and provided in each ATM cell may take on any number of configurations and may be a function of any portion of one or more ATM cells, including the header, all or a portion of a DS1 frame within the cell payload, or any other portion of the cell payload. Given the standard ATM cell size of 53 octets with 5 octets reserved for a header and one octet of the payload used for an ATM adaption layer identifier, there is a 47-octet payload for carrying DS1 frames and an error correction code. Although any mapping configuration where DS1 frames or the like are transported with an error correction code facilitating error correction of the transported DS1 frames falls within the scope of the present invention, four exemplary error correction techniques follow. For each of the examples, assume that there are 376 bits of available payload (47 8-bit octets).

For the first example, one complete DS1 frame is mapped per cell, and the accompanying error correction code is configured to correct errors occurring in the accompanying DS1 frame. In other words, the error correction code within the ATM cell is designed to facilitate error correction for the DS1 frame in that ATM cell. Since a DS1 frame contains 193 bits, there are 183 bits remaining in the payload for the error correction code.

Significant decreases in error rates are accomplished since a vast majority of the DS1 frame may be replicated or encoded in the error correction code. The probability that one or a few bit errors are correctable is extremely high; in fact, it has been found that instead of seeing a frame error rate of 3.3 times or more than that affiliated with transport over a standard TDM network, frame error rates caused by bit errors may be reduced by orders of magnitude. In the present example, buffering of consecutive DS1 frames or ATM cells, as the case may be, is not necessary because each cell is self-contained. As a result, processing and relaying is fast and simple, but overhead associated with the error correction is also relatively high.

For the second example, portions of multiple DS1 frames are mapped into each ATM cell along with an error correction code facilitating error correction for one or more DS1 frames. Depending on the number of bits used for DS1 frames or portions thereof, the payload may include one complete frame and a portion of one or more frames, or portions of multiple frames. Importantly, the error correction code is a function of one or more DS1 frames and may be encapsulated in other ATM cells. As such, buffering of the DS1 frames and the error correction codes is necessary for processing and correction of errors in the DS1 frames. Although the error correction code may facilitate correction for all or a portion of DS1 frames and other ATM cells, the error correction code may include or be solely directed to correction of the accompanying DS1 frame or portion thereof.

Although the first two examples were directed toward correction of all or a portion of DS1 frame(s) in one or more ATM cells, the present invention may also facilitate correction or replacement of ATM cells, which include the cell header as well as the DS1 frame information carried in the ATM cell's payload. As such, example three maps one complete DS1 frame per cell and provides an error correction code for multiple ATM cells. Preferably, the error correction code is configured for cells other than the cell in which the corresponding error correction code is encapsulated. Configuring error correction codes as a function of cells other than the ones in which the code is encapsulated allows for complete replacement of lost cells. For the error correction technique outlined in the table below, there is a cycle that repeats every three cells.

| CELL | PAYLOAD | ERROR CORRECTION |
|------|---------|------------------|
| n-4  | 1DS1 + TYPE + CODE | 1 |
| n-3  | 1DS1 + TYPE + CODE | 2 |
| n-2  | 1DS1 + TYPE + CODE | 0 |
| n-1  | 1DS1 + TYPE + CODE | 1 |
| n    | 1DS1 + TYPE + CODE | 2 |

Since each cell consists of 53 octets, with 6 octets reserved as a header and adaption layer, 193 bits of the payload are configured to contain one DS1 frame. The next two bits in the payload define the type of error correction provided by the error correction code that follows. Since the cycle repeats every three cells, there are three types of cells. A type 0 cell indicates that the last 182 bits of the cell payload is the logical exclusive OR of the last 182 bits of the two previous cells (n-3 and n-4). A type 1 cell indicates that the last 182 bits of the cell payload is the exclusive OR of bits 183 through 364 of the previous second and third cells (n-3 and n-4). The type 2 cell indicates that the first 60 bits of the cell payload is the exclusive OR of the last 60 bits of the previous third and fourth cells (n-3 and n-4). In the present example the remaining 122 bits for type 2 cells are unused. Over the course of three cells, an entire ATM cell may be corrected or replaced using the error correction code.

Again, the invention provides robust error correction without requiring retransmission due to lost or corrupted cells and frames.

The fourth example provides for mapping of all or a portion of multiple DS1 frames in each cell. An error correction code is preferably provided for multiple cells (i.e. correction for more than just DS1 frames). Again, assume that the 53-octet ATM cell requires 48 bits of ATM header and ATM adaption layer. Referring to FIGS. 8A and 8B, the coding scheme is outlined as follows. The variable X represents the number of bits required to complete a DS1 frame that was started in a previous cell. Assuming the DS1 frame includes 193 bits, X will be between 0 and 192. The variable Y represents the number of bits of a complete frame in the current cell. As such, Y will equal 0 or 192 depending on whether there is no complete frame in the current cell or one complete frame in the current cell. The variable Z represents the number of bits of a DS1 frame started in the current cell, and will also range between 0 and 192.

The variable R represents the number of bits used for the error correction code. For example, R represents the number of bits that are the exclusive OR of the previous 424/R frames. If R equals 53 bits, eight (424/53) ATM cells must be buffered to facilitate error correction.

Using an exclusive OR to configure the error correction code provides efficient error checking and correction. For example, if the exclusive OR of two values is used to compute an error correction code, the error correction code of either one of the former values may be exclusively ORed together to check and correct the other value.

Those skilled in the art will recognize that various error correction code generation techniques and schemes are available and are considered within the scope of the present invention and the claims that follow.

What is claimed is:

1. A system for facilitating error correction comprising a control system adapted to receive data frames from a first network and to generate transport frames to transmit over a second network, said transport frames having a payload including at least a portion of a data frame and an error correction code, said error correction code based on at least a portion of one transport frame and adapted to facilitate error correction when said sport frames are processed to recover said data frames.

2. The system of claim 1 wherein said data frames are framed digital signaling frames comprising information bits and a framing bit.

3. The system of claim 2 wherein said data frames have a fixed length.

4. The system of claim 2 wherein said transport frames are fixed-length cells including a header and said payload.

5. The system of claim 1 wherein said data frames are DS1 frames and said transport frames are ATM cells.

6. The system of claim 1 wherein said control system is adapted to place one complete data frame in each transport frame.

7. The system of claim 1 wherein said error correction code is a function of data placed within a transport frame containing said error correction code and configured to facilitate correction of data within the transport frame in which the error correction code is contained.

8. The system of claim 1 wherein said error correction code is a function of a portion of a data frame placed within a transport frame containing said error correction code and configured to facilitate correction of the data frame within the transport frame in which said error correction code is contained.

9. The system of claim 1 wherein said control system is adapted to place one complete data frame in each transport frame and said error correction code is a function of a data frame placed within a transport frame containing said error correction code and configured to facilitate correction of data within the transport frame in which the error correction code is contained.

10. The system of claim 1 wherein said error correction code within one transport frame is configured to facilitate correction of information within another transport frame.

11. The system of claim 10 wherein said error correction code within one transport frame is configured to facilitate correction of at least a portion of a data frame within another transport frame.

12. The system of claim 10 wherein said error correction code within one transport frame is configured to facilitate correction of at least a portion of a header within another transport frame.

13. The system of claim 1 wherein said control system is adapted to place at least a portion of a plurality of data frames in each transport frame and said error correction code is a function of at least a portion of data frames placed within other transport frames and configured to facilitate correction of the data flames within said other transport frames.

14. The control system of claim 13 wherein said error correction code is a function of at least a plurality of portions of data frames placed in a plurality of transport frames.

15. The system of claim 1 wherein said control system is adapted to include at least portions of a plurality of data frames in each cell.

16. The system of claim 1 wherein said control system is adapted to place one complete data frame in each transport frame and said error correction code is a function of at least a portion of another transport frame and configured to facilitate correction of said portion of said another transport frame.

17. The system of claim 16 wherein said error correction code is a function of at least a portion of a plurality of transport frames.

18. The system of claim 1 wherein said control system is adapted to include at least portions of a plurality of data frames in each transport frame and said error correction code is a function of at least a portion of another transport frame and configured to facilitate correction of said portion of said another transport frame.

19. The system of claim 18 wherein said error correction code is a function of at least a portion of a plurality of transport frames.

20. The system of claim 1 wherein said control system is fiber adapted to receive transport frames with a header and a payload including at least a portion of a data frame and an error correction code, said error correction code based on at least a portion of one transport frame; correct errors occurring within transport frames; and generate data frames recovered from said transport frames.

21. The system of claim 20 incorporated within a media gateway comprising a first network interface adapted to connect to the first network carrying data frames and a second network interface adapted to connect the second network carrying transport frames.

22. A system for facilitating error correction comprising a control system adapted to receive transport frames with a header and a payload including at least a portion of a data frame and an error correction code; correct errors occurring within the transport frames based on said error correction codes; and generate data frames, said error correction code based on at least a portion of one transport frame and adapted to facilitate error correction when said transport frames are processed to generate the data frames.

23. The system of claim 22 wherein said control system is further adapted to monitor an error correction code from one transport frame and correct an error within said one transport frame based on said error correction code.

24. The system of claim 23 wherein an error within a data frame within said one transport frame is corrected.

25. The system of claim 22 wherein said control system is further adapted to monitor an error correction code from one transport frame and correct an error within another transport frame.

26. The system of claim 22 wherein said control system is further adapted to use an error correction code from a first transport frame and data from a second transport frame to correct errors in a third transport frame.

27. The system of claim 22 wherein said control system is further adapted to use an error correction code from a first transport frame and data from a second transport frame to correct errors in a data frame in a third transport frame.

28. A computer readable medium comprising software for facilitating error correction by processing data frames and generating transport frames with a header and a payload including at least a portion of a data frame and an error correction code, said error correction code based or at least a portion of one transport frame and adapted to facilitate error correction when said transport frames are processed to recover data frames.

29. A computer readable medium comprising software for facilitating error correction by processing transport frames with a header and a payload including at least a portion of a data fame and an error correction code; correcting errors occurring within the transport frames based on said error correction codes; and generating data frames, said error correction code based on at least a portion of one transport frame and adapted to facilitate error correction when said transport frames are processed to generate the data frames.

30. The computer readable medium of claim 28 further comprising software adapted to facilitate error correction by processing transport frames with a header and a payload including at least a portion of a data frame and an error correction code, said error correction code based on at least a portion of one transport frame; correct errors occurring within transport frames; and generate data frames recovered form said transport frames.

31. A method of facilitating error correction comprising:
a) receiving data frames from a first network;
b) generating transport frames with a header and a payload including at least a portion of a data frame and an error correction code;
c) receiving transport frames from a second network with a payload including at least a portion of a data frame and an error correction code, said error correction code based on at least a portion of one transport frame;
d) correcting errors occurring within said sport frames based on said error collection code; and
e) generating data frames recovered from said transport frames, wherein said error correction code is based on at least a portion of one transport frame and adapted to facilitate error correction when said transport flames are processed to recover data frames.

32. The method of claim 31 wherein said error correction code is a function of at least a portion of a data frame is configured to facilitate error correction of said portion said portion of said First network frame.

33. A system for facilitating error correction comprising:
a) means for receiving data frames from a first network;
b) means for generating transport frames with a header and a payload including at least a portion of a data frame and an error correction code;
c) means for receiving transport frames from a second network with a payload including at least a portion of a data frame and an error correction code, said error correction code based on at least a portion of one transport frame;
d) means for correcting errors occurring within said transport frames based on said error correction code; and
e) means for generating data frames recovered from said transport frames, wherein said error correction code is based on at least a portion of one transport frame and adapted to facilitate error correction when said transport frames are processed to recover data frames.

* * * * *